(12) United States Patent
Masuko

(10) Patent No.: US 11,170,039 B2
(45) Date of Patent: *Nov. 9, 2021

(54) SEARCH SYSTEM, SEARCH CRITERIA SETTING DEVICE, CONTROL METHOD FOR SEARCH CRITERIA SETTING DEVICE, PROGRAM, AND INFORMATION STORAGE MEDIUM

(71) Applicant: RAKUTEN GROUP, INC., Tokyo (JP)

(72) Inventor: Soh Masuko, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 295 days.

This patent is subject to a terminal disclaimer.

(21) Appl. No.: 15/031,269

(22) PCT Filed: Oct. 25, 2013

(86) PCT No.: PCT/JP2013/079045
§ 371 (c)(1),
(2) Date: Apr. 22, 2016

(87) PCT Pub. No.: WO2015/059836
PCT Pub. Date: Apr. 30, 2015

(65) Prior Publication Data
US 2016/0267107 A1 Sep. 15, 2016

(51) Int. Cl.
*G06F 16/583* (2019.01)
*G06F 16/2453* (2019.01)
(Continued)

(52) U.S. Cl.
CPC ........ *G06F 16/5846* (2019.01); *G06F 3/0482* (2013.01); *G06F 3/04842* (2013.01);
(Continued)

(58) Field of Classification Search
CPC ......... G06F 17/30253; G06F 17/30448; G06F 3/04842; G06F 3/0482; G06F 17/30672; G06Q 30/0643
See application file for complete search history.

(56) References Cited

U.S. PATENT DOCUMENTS 8,099,418 B2 * 1/2012 Inoue ................ G06F 16/90335
707/748
2005/0027704 A1 * 2/2005 Hammond ........ G06F 16/24578
(Continued)

FOREIGN PATENT DOCUMENTS

WO 2011/046808 A1 4/2011

OTHER PUBLICATIONS

"Yahoo! product search help", [online], [retrieved on Oct. 18, 2013], Internet http://www.yahoo-help.jp/app/answers/detail/p/586/a_id/42567/ Pertinent parts discussed in "Background Art" of the specification.
(Continued)

*Primary Examiner* — Aleksandr Kerzhner
*Assistant Examiner* — Aryan D Toughiry
(74) *Attorney, Agent, or Firm* — HEA Law PLLC

(57) ABSTRACT

An item extraction unit extracts, when a user selects an item from a list of items to be selected by the user, at least one item from among items that are not selected by the user. A word acquisition unit acquires a word that is contained in text information associated with the item selected by the user and is not contained in text information associated with the item extracted by the item extraction unit. A search condition setting unit sets a search condition for searching for an item that is similar to the item selected by the user based on the word acquired by the word acquisition unit. A search execution unit executes a search based on the search condition.

13 Claims, 10 Drawing Sheets

(51) Int. Cl.
*G06F 16/33* (2019.01)
*G06F 3/0482* (2013.01)
*G06F 3/0484* (2013.01)
*G06Q 30/06* (2012.01)

(52) U.S. Cl.
CPC .... *G06F 16/24534* (2019.01); *G06F 16/3338* (2019.01); *G06Q 30/0643* (2013.01)

(56) References Cited

U.S. PATENT DOCUMENTS

| | | | | |
|---|---|---|---|---|
| 2008/0177640 | A1* | 7/2008 | Gokturk | G06Q 30/0603 705/26.62 |
| 2008/0235275 | A1* | 9/2008 | Tanaka | G06F 17/30265 |
| 2008/0307343 | A1* | 12/2008 | Robert | G06F 3/0482 715/765 |
| 2010/0281036 | A1* | 11/2010 | Inoue | G06F 16/90335 707/749 |
| 2011/0239163 | A1* | 9/2011 | Mochizuki | G06F 16/904 715/853 |
| 2013/0311502 | A1* | 11/2013 | Takata | G06F 19/321 707/758 |
| 2014/0280006 | A1* | 9/2014 | Chakra | G06F 40/194 707/707 |
| 2014/0297628 | A1* | 10/2014 | Tsuji | G06F 17/30687 707/723 |

OTHER PUBLICATIONS

Search Report dated May 26, 2017, for corresponding EP Patent Application No. 13896116.4.

* cited by examiner

FIG.5

| STORE ID | PRODUCT ID | TITLE | PRICE | PRODUCT IMAGE | PRODUCT PAGE |
|---|---|---|---|---|---|
| S1 | P1 | ABC X SERIES TOTE BAG VIOLET 8HS999 043 001 [FREE SHIPPING] [50% OFF] [NEW AND UNUSED] | --- | --- | --- |
| S2 | P1 | ABC 8H999-043 001 VIOLET X SERIES HANDBAG | --- | --- | --- |
| S2 | P5 | [NEW AND UNUSED] ABC X SERIES TOTE BAG BLACK 3S0 500-888 | --- | --- | --- |
| S10 | P10 | ABC ROUND FASTENER LONG WALLET 3P0400 043 002 RED [FREE SHIPPING] | --- | --- | --- |
| S25 | P15 | ABC PERFUME 75 ml 3507306202300 [SHIPPING BY DELIVERY SERVICE] | --- | --- | --- |
| ... | ... | ... | ... | ... | ... |

SEARCH SYSTEM, SEARCH CRITERIA SETTING DEVICE, CONTROL METHOD FOR SEARCH CRITERIA SETTING DEVICE, PROGRAM, AND INFORMATION STORAGE MEDIUM

CROSS REFERENCE TO RELATED APPLICATIONS

This application is a National Stage of International Application No. PCT/JP2013/079045 filed on Oct. 25, 2013. The contents of the above document is incorporated herein by reference in its entirety.

TECHNICAL FIELD

The present invention relates to a search system, a search condition setting device, a control method for a search condition setting device, a program, and an information storage medium.

BACKGROUND ART

There is known a search system configured to set, when a user selects any one of items displayed on an item list screen, a search condition for searching for an item similar to the item selected by the user based on a word contained in text information associated with the item selected by the user.

For example, a product search system described in Non Patent Literature 1 has a function of setting, when a user selects any one of products displayed on a product list screen, a search condition for searching for a product similar to the product selected by the user. In this product search system, a "similar product search" link button is associated with each product. When the user clicks on a "similar product search" link button associated with any one of products, a plurality of keywords are automatically extracted from a title (name) of the product, and a product including all of the plurality of keywords is searched for.

CITATION LIST

Non Patent Literature

[Non Patent Literature 1] "Yahoo! product search help", [online], [retrieved on Oct. 18, 2013], Internet <http://www.yahoo-help.jp/app/answers/detail/p/586/a_id/42567/>

SUMMARY OF INVENTION

Technical Problem

In general, in a virtual shopping mall in which a plurality of stores are opened, each store registers a title of a product. Each store tends to include various keywords in a title of a product in order for the product to match various search keywords. Thus, in the product search system as described above, there is a fear that a keyword unnecessary for searching for a similar product is extracted from the title of the product and such a keyword is included in a search condition. As a result, there is a fear that an accuracy of the search condition for searching for a similar product deteriorates and such a search result as to satisfy the user cannot be acquired as a search result for a similar product.

The present invention has been made in view of the above-mentioned problem, and it is an object of the present invention to provide a search system, a search condition setting device, a control method for a search condition setting device, a program, and an information storage medium capable of improving an accuracy of a search condition in a case where the search condition for searching for an item similar to an item selected by a user is set based on a word contained in text information associated with the item selected by the user.

Solution to Problem

In order to solve the above-mentioned problem, a search system according to one embodiment of the present invention includes: item extraction means for extracting, when a user selects an item from a list of items to be selected by the user, at least one item from among items that are not selected by the user; word acquisition means for acquiring a word that is contained in text information associated with the item selected by the user and is not contained in text information associated with the at least one item extracted by the item extraction means; search condition setting means for setting a search condition for searching for an item that is similar to the item selected by the user based on the word acquired by the word acquisition means; and search execution means for executing a search based on the search condition.

Further, a search condition setting device according to one embodiment of the present invention includes: item extract ion means for extracting, when a user selects an item from a list of items to be selected by the user, at least one item from among items that are not selected by the user; word acquisition means for acquiring a word that is contained in text information associated with the item selected by the user and is not contained in text information associated with the at least one item extracted by the item extraction means; and search condition setting means for setting a search condition for searching for an item that is similar to the item selected by the user based on the word acquired by the word acquisition means.

Further, a control method for a search condition setting device according to one embodiment of the present invention includes: an item extraction step of extracting, when a user selects an item from a list of items to be selected by the user, at least one item from among items that are not selected by the user; a word acquisition step of acquiring a word that is contained in text information associated with the item selected by the user and is not contained in text information associated with the at least one item extracted in the item extraction step; and a search condition setting step of setting a search condition for searching for an item that is similar to the item selected by the user based on the word acquired in the word acquisition step.

Further, a program according to one embodiment of the present invention is a program for causing a computer to function as: item extraction means for extracting, when a user selects an item from a list of items to be selected by the user, at least one item from among items that are not selected by the user; word acquisition means for acquiring a word that is contained in text information associated with the item selected by the user and is not contained in text information associated with the at least one item extracted by the item extraction means; and search condition setting means for setting a search condition for searching for an item that is similar to the item selected by the user based on the word acquired by the word acquisition means.

Further, an information storage medium according to one embodiment of the present invention is a computer-readable information storage medium storing a program for causing a computer to function as: item extraction means for extracting, when a user selects an item from a list of items to be selected by the user, at least one item from among items that are not selected by the user; word acquisition means for acquiring a word that is contained in text information associated with the item selected by the user and is not contained in text information associated with the at least one item extracted by the item extraction means; and search condition setting means for setting a search condition for searching for an item that is similar to the item selected by the user based on the word acquired by the word acquisition means.

Further, in one aspect of the present invention, the item extraction means may extract, from among the items that are not selected by the user, an item that is not the same as and is not similar to the item selected by the user.

Further, in one aspect of the present invention, the item extraction means may extract, from among the items that are not selected by the user, an item associated with an image that is not the same as and is not similar to an image associated with the item selected by the user.

Further, in one aspect of the present invention, the item extraction means may include: means for acquiring similarity degrees between the image associated with the item selected by the user and each image associated with the items that are not selected by the user; and means for extracting an item having the similarity degree that is less than a threshold value from among the items that are not selected by the user.

Further, in one aspect of the present invention, the item extraction means may include means for acquiring similarity degrees between the image associated with the item selected by the user and each image associated with the items that are not selected by the user, and the item extraction means may not extract an item having the similarity degree that is larger than a threshold value from among the items that are not selected by the user.

Further, in one aspect of the present invention, the item extraction means may include: means for acquiring similarity degrees between the image associated with the item selected by the user and each image associated with the items that are not selected by the user; and means for extracting a predetermined number of items in an order starting from an item having the lowest similarity degree from among the items that are not selected by the user.

Further, in one aspect of the present invention, the item extraction means may extract, from among the items that are not selected by the user, an item associated with identification information that is different from identification information associated with the item selected by the user.

Further, in one aspect of the present invention, the item extraction means may extract the at least one item from among the items that are not selected by the user based on degrees of separation between a display position on a screen of the item selected by the user and each of display positions on the screen of the items that are not selected by the user.

Further, in one aspect of the present invention, the item extraction means may extract an item having a degree of separation from the display position of the item selected by the user that is less than a predetermined degree from among the items that are not selected by the user.

Further, in one aspect of the present invention, the search system may include means for acquiring a duplicate word, the duplicate word being a word having a meaning that is the same as or is similar to that of a word that is contained in text information associated with an item associated with an image that is the same as or is similar to an image associated with the item selected by the user among words contained in text information associated with the item selected by the user, and the search condition setting means may set the search condition based on the word acquired by the word acquisition means and the duplicate word.

Further, in one aspect of the present invention, the search system may include means for acquiring a duplicate word, the duplicate word being a word having a meaning that is the same as or is similar to that of a word that is contained in text information associated with an item associated with identification information that is the same as or is similar to identification information associated with the item selected by the user among words contained in text information associated with the item selected by the user, and the search condition setting means may set the search condition based on the word acquired by the word acquisition means and the duplicate word.

Further, in one aspect of the present invention, the search system may include means for acquiring, when the user selects a plurality of items, a duplicate word that corresponds to words whose meanings are the same or similar with each other and which are contained duplicately in pieces of text information associated with the plurality of items selected by the user, and the search condition setting means may be configured to set the search condition based on the word acquired by the word acquisition means and the duplicate word.

Further, a search condition setting device according to one embodiment of the present invention includes: item extract ion means for extracting, when a user selects an item from a list of items to be selected by the user, at least one item from among items that are not selected by the user; category comparison means for comparing a category of the item selected by the user with a category of the at least one item extracted by the item extraction means; and search condition setting means for setting, when the category of the item selected by the user is different from the category of the at least one item extracted by the item extraction means, a search condition for searching for an item that is similar to the item selected by the user among items that do not belong to the category of the at least one item extracted by the item extraction means.

Further, a control method for a search condition setting device according to one embodiment of the present invention includes: an item extraction step of extracting, when a user selects an item from a list of items to be selected by the user, at least one item from among items that are not selected by the user; a category comparison step of comparing a category of the item selected by the user with a category of the at least one item extracted in the item extraction step; and a search condition setting step of setting, when the category of the item selected by the user is different from the category of the at least one item extracted in the item extraction step, a search condition for searching for an item that is similar to the item selected by the user among items that do not belong to the category of the at least one item extracted in the item extraction step.

Further, a program according to one embodiment of the present invention is a program for causing a computer to function as: item extraction means for extracting, when a user selects an item from a list of items to be selected by the user, at least one item from among items that are not selected by the user; category comparison means for comparing a category of the item selected by the user with a category of the at least one item extracted by the item extraction means; and search condition setting means for setting, when the category of the item selected by the user is different from the category of the at least one item extracted by the item extraction means, a search condition for searching for an item that is similar to the item selected by the user among items that do not belong to the category of the at least one item extracted by the item extraction means.

Advantageous Effects of Invention

According to the embodiments of the present invention, it is possible to improve the accuracy of the search condition in the case where the search condition for searching for an item similar to the item selected by the user is set based on a word contained in text information associated with the item selected by the user.

BRIEF DESCRIPTION OF DRAWINGS

FIG. 5 is at able for showing an example of a product information table.

DESCRIPTION OF EMBODIMENTS

Now, an exemplary embodiment of the present invention is described in detail with reference to the drawings. In the following, an example of a case is described in which the present invention is applied to an electronic commerce system that implements a virtual shopping mall in which a plurality of stores are opened. Specifically, the description is about an example of a case where a search system according to the embodiment of the present invention is implemented in an electronic commerce system.

First Embodiment

Figure 1:
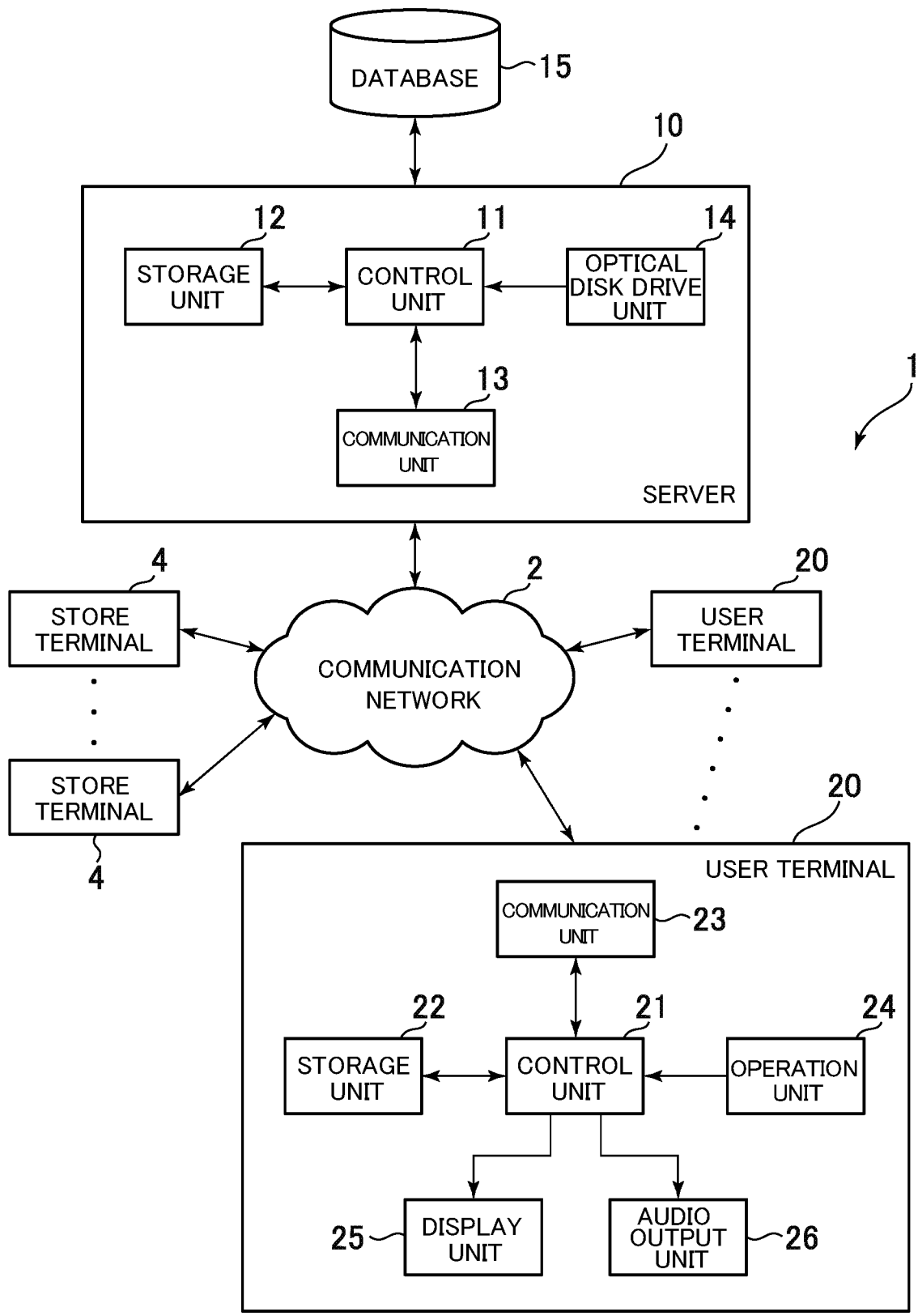
FIG. 1 is a diagram for illustrating an example of an overall configuration of an electronic commerce system (search system) according to an embodiment of the present invention.

FIG. 1 is an illustration of an example of an overall configuration of an electronic commerce system 1 (search system) according to the first embodiment of the present invention. As illustrated in FIG. 1, the electronic commerce system 1 according to the first embodiment includes a server 10, a database 15, a user terminal 20, and a store terminal 4. The server 10, the user terminal 20, and the store terminal 4 are connected to a communication network 2, which is configured to include, for example, the Internet or the like. Mutual data communication is available between the server 10 and the user terminal 20, and mutual data communication is also available between the server 10 and the store terminal 4.

The server 10 is a server which functions as a portal of the virtual shopping mall. As illustrated in FIG. 1, the server 10 includes a control unit 11, a storage unit 12, a communication unit 13, and an optical disc drive unit 14. The control unit 11 includes one or a plurality of microprocessors and executes information processing in accordance with a program stored in the storage unit 12. The storage unit 12 includes a main memory unit (e.g., RAM) and an auxiliary storage unit (e.g., ROM, hard disk drive, or solid state drive). The communication unit 13 is configured to execute data communication via the communication network 2.

The optical disc drive unit 14 is configured to read a program or data recorded on an optical disc (information storage medium). The program or data is supplied to the storage unit 12 via an optical disc (information storage medium). Specifically, the program or data stored on the optical disc is read by the optical disc drive unit 14 and stored in the storage unit 12.

Note that, the server 10 may include a component (e.g., memory card slot unit) configured to read a program or data stored in an information storage medium other than the optical disc (e.g., memory card). Then, the program or data may be supplied to the storage unit 12 via the information storage medium other than the optical disc. Further, a program or data may be supplied to the storage unit 12 via the communication network 2.

The server 10 can access the database 15. The database 15 stores, for example, data on a user who uses the virtual shopping mall, data on a store opened in the virtual shopping mall, data on a product available in the virtual shopping mall, and data on a history of a transaction made in the virtual shopping mall. Note that, the database 15 may be built in a server other than the server 10, or may be built in the server 10.

The user terminal 20 is an information processing device to be used by a user. For example, the user terminal 20 is a mobile phone (including smartphone), a tablet computer, a laptop computer, or a desktop computer.

As illustrated in FIG. 1, the user terminal 20 includes a control unit 21, a storage unit 22, a communication unit 23, an operation unit 24, a display unit 25, and an audio output unit 26. The control unit 21, the storage unit 22, and the communication unit 23 are similar to the control unit 11, the storage unit 12, and the communication unit 13 of the server 10.

A program or data is supplied to the storage unit 22 via the communication network 2. Note that, the user terminal 20 may include a component (e.g., optical disc drive unit or memory card slot unit) configured to read a program or data stored in an information storage medium (e.g., optical disc or memory card). Then, the program or data may be supplied to the storage unit 22 via the information storage medium (e.g., memory card).

The operation unit 24 is used by a user for operation. For example, when a pointing device for specifying a position in a screen displayed on the display unit 25 is included in the user terminal 20, the pointing device corresponds to the operation unit 24. That is, for example, a mouse, a stick, a touch pad, or a touch panel overlaid on the display unit 25 corresponds to the operation unit 24.

The display unit 25 is, for example, a liquid crystal display or an organic EL display, and is configured to display various screens. The audio output unit 26 is, for example, a speaker or headphones, and is configured to output various sounds.

The store terminal 4 is an information processing device that is provided in the store opened in the virtual shopping mall. The store terminal 4 is used to register information on a product to be sold in the virtual shopping mall and other types of information in the database 15 via the server 10. For example, the store terminal 4 is a tablet computer, a laptop computer, or a desktop computer. The store terminal 4 has a hardware configuration similar to that of the user terminal 20.

For example, a daemon program (e.g., HTTP daemon) is executed on the server 10. Further, a program (e.g., web browser) is started on the user terminal 20, and a processing request (e.g., HTTP request) is transmitted from the user terminal 20 to the server 10. In this case, a processing result (e.g., HTTP response) corresponding to the above-mentioned processing request is transmitted to the user terminal 20 from the server 10. For example, data described in a page description language is transmitted to the user terminal 20. Then, a screen that is based on the processing result is displayed on the display unit 25 of the user terminal 20 on the basis of this data. Note that, similar processing is performed between the store terminal 4 and the server 10.

In the following, a description is given of a screen displayed on the display unit 25 of the user terminal 20 when the virtual shopping mall is used. The screen described below is displayed through execution of a data communication between the user terminal 20 and the server 10.

Figure 2:
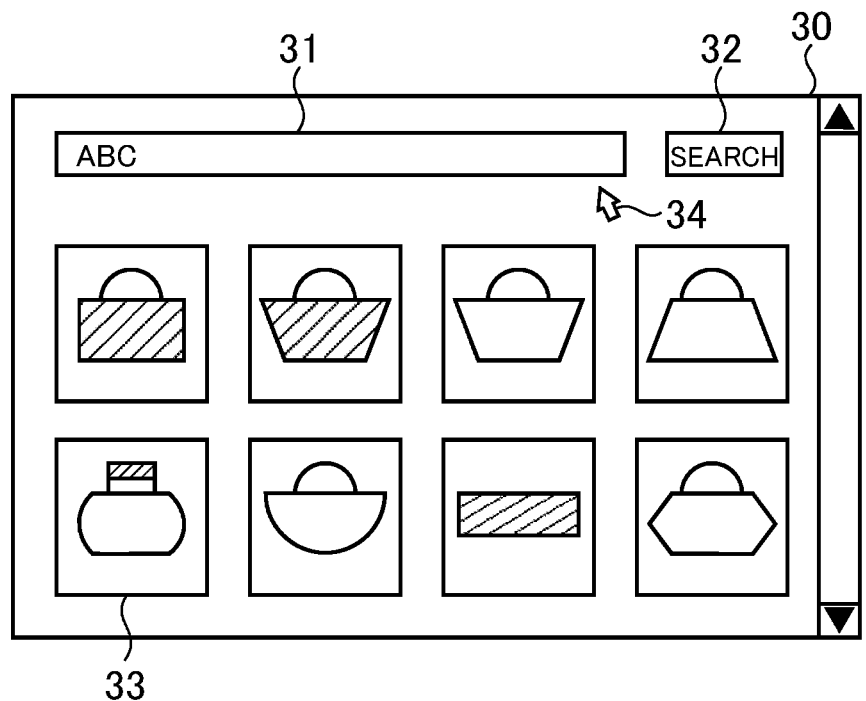
FIG. 2 is a diagram for illustrating an example of a search screen.

When the virtual shopping mall is used, the user uses the user terminal 20 to access the server 10. The user specifies a keyword and searches for a product, to thereby look for a desired product. FIG. 2 is an illustration of an example of a search screen for searching for a product.

A search screen 30 illustrated in FIG. 2 includes a keyword field 31 and a search button 32. A keyword for searching for a product is input to the keyword field 31. In the search screen 30 illustrated in FIG. 2, one keyword "ABC" is input to the keyword field 31. This word is a keyword for searching for a product manufactured by, for example, ABC company.

When the search button 32 is clicked, search processing is executed and a list of products whose title or product page contains all of the keywords input to the keyword field 31 is displayed on the search screen 30. A list of product images 33 is displayed on the search screen 30 illustrated in FIG. 2, and a title, a price, and the like of a product are omitted.

The product image 33 is an image registered by each store in advance. In general, the store uses an image provided by a manufacturer of a product as the product image 33. In the virtual shopping mall, the same product may be sold by more than one store, but it is often the case that the product images 33 of the same product are often the same or similar with each other. Note that, however, the product images 33 are registered by each store, and thus there is a case that the product images 33 of the same product are not the same or a similar with each other. A character string such as "free shipping" or "greatly popular", or an ornament may be appended to the product image 33.

When the user clicks anyone of the product images 33, a product screen (not shown) relating to a product associated with the product image 33 is displayed on the display unit 25 of the user terminal 20. The product screen is a screen for checking detailed information on a product or for purchasing a product.

The electronic commerce system 1 has a function of supporting a search for a similar product of a desired product. In the following, a description is given of this function.

Figure 3:
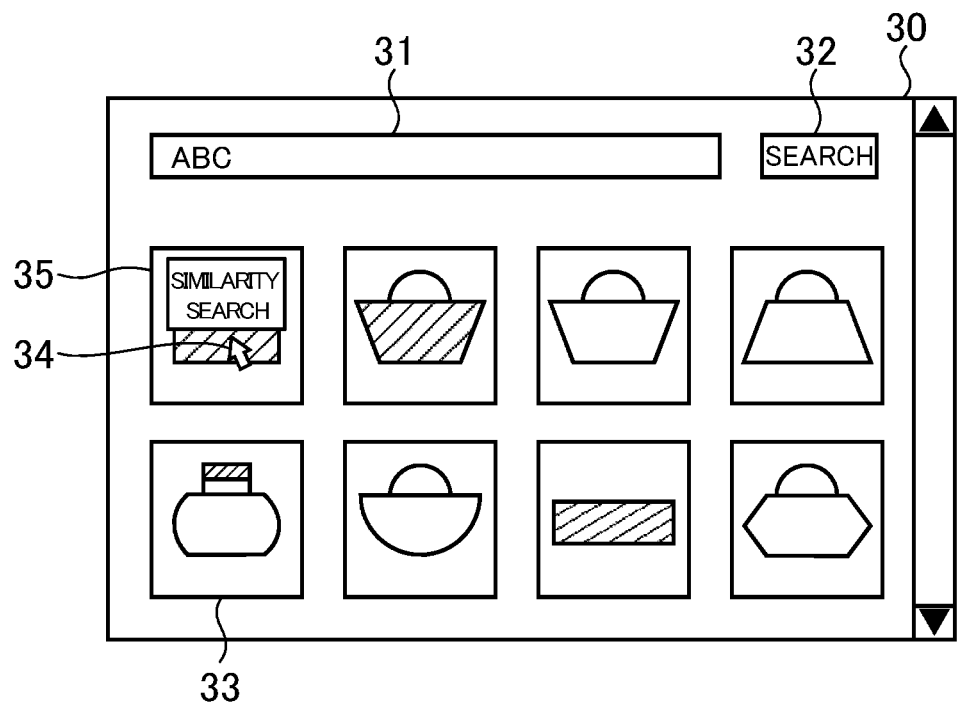
FIG. 3 is a diagram for illustrating another example of the search screen.

When a similar product is searched for, the user moves a cursor 34 onto the product image 33 to select a desired product. When the user moves the cursor 34 onto the product image 33, a similarity search icon 35 is displayed on the product image 33 as illustrated in FIG. 3. The similarity search icon 35 is used to give an instruction to search for a similar pro duct of the pro duct associated with the product image 33.

When the user clicks the similarity search icon 35, at least one of words contained in a title of the product selected by the user is acquired. Further, a search condition for searching for a similar product is set based on the acquired word. Then, a search is executed based on the search condition and a list of products acquired by the search is displayed on the search screen 30.

Figure 4:
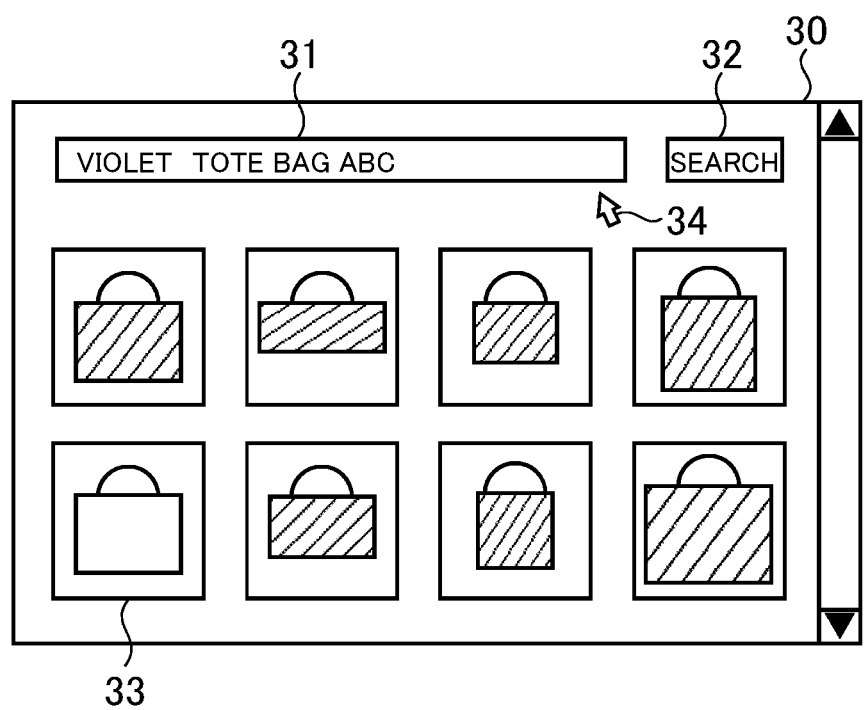
FIG. 4 is a diagram for illustrating still another example of the search screen.

FIG. 4 is an illustration of an example of the search screen 30 in this case. In the search screen 30 illustrated in FIG. 4, three keywords, namely, "violet", "tote bag", and "ABC" are input to the keyword field 31. Those keywords are acquired from the title of the product selected by the user. Note that, in this case, a list of the product images 33 of products whose title or product page contains all of the above-mentioned three keywords is displayed on the search screen 30.

In the electronic commerce system 1, it is configured to lower a possibility that a word unnecessary for searching for a similar product is set as the keyword. In the following, a description is given of a configuration for realizing this.

First, a description is given of data stored in the database 15. As described above, the data on a user who uses the virtual shopping mall, the data on a store opened in the virtual shopping mall, and the data on a product available in the virtual shopping mall are stored in the database 15.

FIG. 5 is an illustration of an example of a product information table. The product information table shows information on product s sold at each store. The product information table shown in FIG. 5 contains "store ID", "product ID", "title", "price", "product image", and "product page" fields.

The "store ID" field shows a store ID of a store. The store ID is identification information for uniquely identifying a store. The "product ID" field shows a product ID of a product sold in a store. The product ID is identification information for uniquely identifying a product. Even when different stores sell the same products, the same product ID is appended to those products.

The "title" field shows a title (name) of a product registered by a store. In the electronic commerce system 1, each store registers a title of a product. Each store tends to include various keywords in a title of a product in order for the product to match various search keywords. Thus, as shown in FIG. 5, numerous words are contained in a title of a product. Those numerous words contain a word that has low relevance to product-specific characteristics (that is, a word that is not beneficial for searching for a similar product) as well as a word that has high relevance to product-specific characteristics (that is, a word that is beneficial for searching for a similar product).

The "price" field shows a selling price of a product registered by a store. In the electronic commerce system 1, each store is allowed to register a selling price of a product. The "product image" field shows link information to a product image registered by a store. The "product page" field shows link information to a product page registered by a store.

Figure 6:
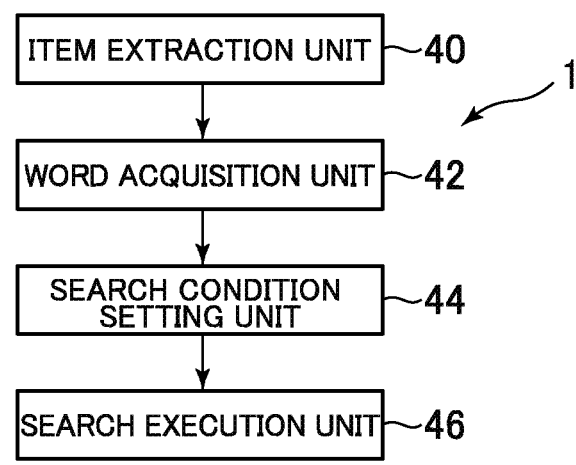
FIG. 6 is a functional block diagram for illustrating an example of functions implemented in an electronic commerce system according to the first embodiment and the second embodiment.

FIG. 6 is a functional block diagram for illustrating functional blocks implemented in the electronic commerce system 1. As illustrated in FIG. 6, the electronic commerce system 1 includes an item extraction unit 40 (item extraction means), a word acquisition unit 42 (word acquisition means), a search condition setting unit 44 (search condition setting means), and a search execution unit 46 (search execution means).

Those functional blocks are implemented by the server 10 or the user terminal 20. In the following, a description is given of a case where those functional blocks are implemented by the server 10 (search condition setting device). That is, a description is given of a case where the control unit 11 of the server 10 executes processing in accordance with a program to thereby function as the item extraction unit 40, the word acquisition unit 42, the search condition setting unit 44, and the search execution unit 46.

The item extraction unit 40 extracts, when the user selects an item from a list of items to be selected by the user, at least one item from among items that are not selected by the user. As used herein, an "item" is a thing that can be a search object, and refers to, for example, a product or a service.

For example, the item extraction unit 40 extracts an item that is not the same as and is not similar to the item selected by the user from among items that are not selected by the user. That is, the item extraction unit 40 does not extract an item that is the same as the item selected by the user or an item that is similar to the item selected by the user.

In the case of the above-mentioned example (refer to FIG. 2 to FIG. 4), the list of products displayed on the search screen 30 corresponds to an example of the "list of items". Further, the product selected by the user corresponds to an example of the "item selected by the user".

In the case of the above-mentioned example, the item extraction unit 40 extracts a product that is not the same as and is not similar to the product selected by the user (hereinafter referred to as "dissimilar product") from among products that are not selected by the user. Note that, such a dissimilar product is extracted from among products displayed on the search screen 30.

The item extraction unit 40 regards, as a dissimilar product, a product associated with a product image that is not the same as and is not similar to the product image associated with the product selected by the user. Thus, the item extraction unit 40 extracts, from among products that are not selected by the user, a product associated with a product image that is not the same as and is not similar to the product image associated with the product selected by the user.

First, the item extract ion unit 40 acquires similarity degrees between the product image of the product selected by the user and the product images of products that are not selected by the user. This similarity degree is calculated using a known method. In this case, the above-mentioned similarity degrees may be calculated for all the products that are not selected by the user among products displayed on the search screen 30. In another case, the above-mentioned similarity degrees may be calculated for products that are not selected by the user among products displayed within a predetermined range from a display position of the product selected by the user.

Then, the item extraction unit 40 extracts products whose similarity degrees are less than a threshold value from among products that are not selected by the user.

Note that, the item extraction unit 40 may extract a predetermined number of products in an order starting from a product having the lowest similarity degree from among products that are not selected by the user. For example, the item extraction unit 40 may extract products having the lowest to n-th lowest similarity degrees from among products that are not selected by the user. In another case, the item extraction unit 40 may extract a product having the lowest similarity degree from among products that are not selected by the user.

The word acquisition unit 42 acquires a word that is contained in text information associated with the item selected by the user and not contained in text information associated with an item extracted by the item extraction unit 40.

In the case of the above-mentioned example (refer to FIG. 2 to FIG. 4), the title of a product corresponds to an example of the "text information". That is, the word acquisition unit 42 acquires the title of the product selected by the user and the title of the product extracted by the item extraction unit 40. Then, the word acquisition unit 42 acquires words that are contained in the respective titles through natural language processing.

Now, it is assumed that the title of the product selected by the user is "(a)" given below.

(a) ABC X series tote bag violet 8HS999 043 001 [free shipping] [50% OFF] [new and unused]

Further, it is assumed that the titles of the products extracted by the item extraction unit 40 are "(b)" to "(d)" given below.

(b) [New and unused] ABC X series tote bag black 3S0500-888

(c) ABC round fastener long wallet 3P0400 043 002 red [free shipping]

(d) ABC perfume 75 ml 3507306202300 [shipping by delivery service]

The word acquisition unit 42 excludes a word containing a number from the words that are acquired from the respective titles. For example, a word indicating discount information is not a word indicating a product-specific characteristic, and thus this word is not beneficial for searching for a similar product. The word acquisition unit 42 excludes a word containing a number, to thereby exclude a word indicating such discount information.

After that, the word acquisition unit 42 acquires a word that is contained in the title of the product selected by the user and not contained in the title of the product extracted by the item extraction unit 40.

In this case, for example, a word as given below is acquired.

"violet"

Note that, the word acquisition unit 42 determines whether or not a word indicating a category name of a product is contained in the title of the product selected by the user. This determination is executed based on dictionary data in which category names are registered. When the category is registered in association with the product ID, this information may be utilized.

In this case, a word as given below is acquired, for example.

"tote bag"

Further, the word acquisition unit 42 determines whether or not a word indicating a brand name of a product is contained in the title of the product selected by the user. This determination is executed based on dictionary data in which brand names are registered.

In this case, for example, a word as given below is acquired.

"ABC"

As described above, the word acquisition unit 42 acquires words as given below.

"violet", "tote bag", "ABC"

The search condition setting unit 44 sets a search condition for searching for an item similar to the item selected by the user based on the word that is acquired by the word acquisition unit 42.

For example, when the word acquisition unit 42 acquires one word, the search condition setting unit 44 sets a search condition so as to contain this one word.

On the other hand, when the word acquisition unit 42 acquires a plurality of words, the search condition setting unit 44 sets a search condition so as to contain those plurality of words concatenated with an AND condition.

A search condition is set as below, for example.

"violet" and "tote bag" and "ABC"

Note that, the search condition setting unit 44 may include a keyword input to the keyword field 31 of the search screen 30 in the search condition. Further, the search condition setting unit 44 may relatively increase the weight of the word acquired by the word acquisition unit 42. That is, the search condition setting unit 44 may include, in the search condition, not only the word acquired by the word acquisition unit 42 but also another word acquired from the title of the product selected by the user. Then, the search condition setting unit 44 may set the weight of the word acquired by the word acquisition unit 42 larger than the weight of the other word.

The search execution unit 46 executes a search based on the search condition set by the search condition setting unit 44.

Figure 7:
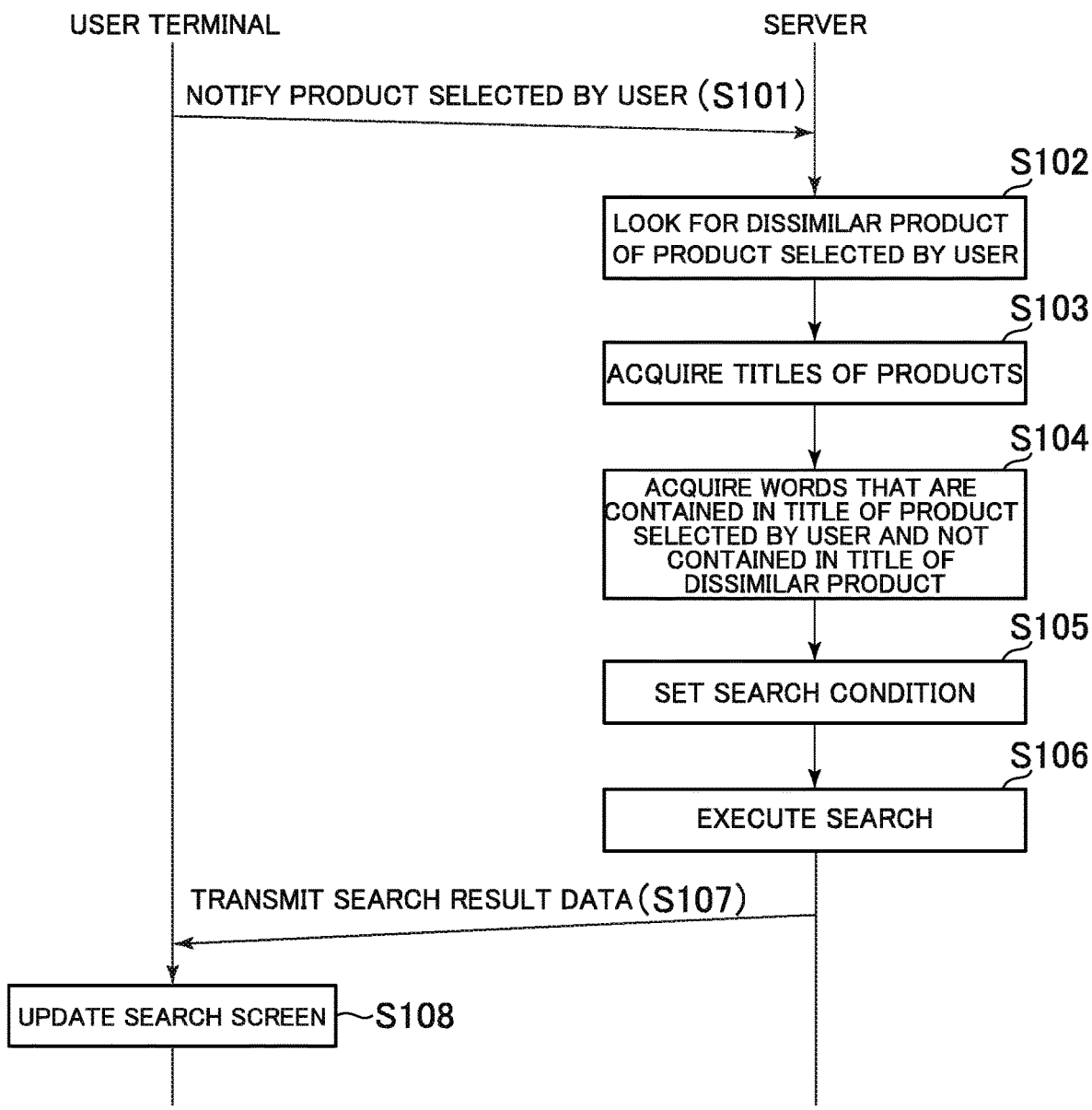
FIG. 7 is a diagram for illustrating an example of processing to be executed in the electronic commerce system according to the first embodiment.

Next, a description is given of processing for implementing the functional blocks described above. FIG. 7 is an illustration of an example of processing to be executed when the similarity search icon 35 is clicked.

When the similarity search icon 35 displayed on the product image 33 is clicked, as illustrated in FIG. 7, the control unit 21 of the user terminal 20 notifies the server 10 of the product selected by the user (that is, the product corresponding to the product image 33), to thereby request a search for a similar product (S101). In this case, for example, the store ID and the product ID of the product selected by the user are transmitted to the server 10.

When the above-mentioned request is received by the server 10, the control unit 11 of the server 10 looks for a dissimilar product of the product selected by the user (S102). That is, the control unit 11 looks for a product associated with a product image that is not the same as and is not similar to the product image of the product selected by the user.

For example, in Step S101, a list of products displayed on the search screen 30 (in another case, a list of products displayed on display unit 25) is transmitted to the server 10, and the control unit 11 looks for a dissimilar product of the product selected by the user among products displayed on the search screen 30 (in another case, products displayed on display unit 25). Note that, the control unit 11 may look for a dissimilar product of the product selected by the user among products stored in the database 15.

After Step S102 is executed, the control unit 11 acquires the title of the product selected by the user and the title of the dissimilar product found in Step S102 (S103). Then, the control unit 11 acquires a word that is contained in the title of the product selected by the user and not contained in the title of the dissimilar product found in Step S102 (S104). Note that, the control unit 11 excludes a word containing a number. Further, when a word indicating a category name of a product and a word indicating a brand name of a product are contained in the title of the product selected by the user, the control unit 11 acquires those words as well.

The control unit 11 sets the search condition based on the words acquired in Step S104 (S105). Further, the control unit 11 executes a search based on the search condition set in Step S105 (S106). In this case, a list of products whose title or product page contains all of the words acquired in Step S104 is acquired as a search result.

After Step S106 is executed, the control unit 11 transmits search result data indicating the search result to the user terminal 20 (S107). The control unit 21 of the user terminal 20 updates the search screen 30 based on this search result data (S108). In this case, the list of products acquired as the search result is displayed on the search screen 30. Further, the words contained in the search condition set in Step S105 are displayed in the keyword field 31.

In the electronic commerce system 1 according to the first embodiment described above, a word that is contained in the title of the product selected by the user and not contained in the title of the dissimilar product of the product selected by the user are acquired. In this case, a word indicating characteristics of the dissimilar product of the product are excluded from the words contained in the title of the product selected by the user, and thus the word acquired as described above are more likely to be a word having high relevance to characteristics specific to the product selected by the user (that is, a word beneficial for searching for similar product).

Then, in the electronic commerce system 1, the search condition for searching for a similar product of the product selected by the user is set based on the word acquired as described above. Thus, using the electronic commerce system 1, the search condition is more likely to contain a word having high relevance to the characteristics specific to the product selected by the user, and on the other hand the search condition is less likely to contain a word having low relevance to the characteristics specific to the product selected by the user. That is, the accuracy of the search condition for searching for a similar product of the product selected by the user is improved.

Note that, the item extraction unit 40 is not limited to the one described above. For example, the item extraction unit 40 may extract a product having a product ID different from the product ID of the product selected by the user as the dissimilar product of the product selected by the user. In this manner, the dissimilar product of the product selected by the user may be extracted.

Second Embodiment

The overall configuration of an electronic commerce system 1 according to the second embodiment of the present invention is the same as that of the first embodiment (refer to FIG. 1). Further, also in the electronic commerce system 1 according to the second embodiment, the same search screen 30 as that of the first embodiment is displayed (refer to FIG. 2 to FIG. 4), and the same data as that of the first embodiment is stored (refer to FIG. 5).

In the same manner as in the first embodiment, the electronic commerce system 1 according to the second embodiment includes the item extraction unit 40 (item extraction means), the word acquisition unit 42 (word acquisition means), the search condition setting unit 44 (search condition setting means), and the search execution unit 46 (search execution means) (refer to FIG. 6). The operation of the functional blocks other than the item extraction unit 40 is the same as that of the first embodiment, and thus a description thereof is omitted here.

The item extraction unit 40 in the second embodiment is the same as the item extraction unit 40 in the first embodiment in that the item extraction unit 40 in the second embodiment extracts at least one item from among items that are not selected by the user. However, the item extraction unit 40 in the second embodiment is different from the item extraction unit 40 in the first embodiment in the following point.

The item extraction unit 40 in the second embodiment extracts at least one item from among items that are not selected by the user based on degrees of separation between a display position on the screen of the item selected by the user and display positions on the screen of items that are not selected by the user.

For example, the item extraction unit 40 extracts items whose degrees of separation from the display position of the item selected by the user are less than a predetermined degree from among items that are not selected by the user.

For example, in the case of the above-mentioned example (refer to FIG. 2 to FIG. 4), the item extraction unit 40 extracts products (product images 33) whose distances from the product (product image 33) selected by the user are less than a threshold value. For example, the item extraction unit 40 extracts products (product images 33) displayed adjacent to the product (product image 33) selected by the user.

In this case, the word acquisition unit 42 acquires a word that is contained in the title of the product selected by the user and not contained in the titles of the products displayed adjacent to the product selected by the user. Then, the search condition setting unit 44 sets the search condition based on such a word.

"Products displayed close to the product selected by the user among products that are not selected by the user" are highly likely to be "products which have been seen by the user but to which the user has no interest". Thus, through use of the above-mentioned item extraction unit 40 and the word acquisition unit 42, a word indicating characteristics of products to which the user has no interest is excluded from words contained in the title of the product selected by the user. As a result, the word acquired by the word acquisition unit 42 is more likely to be a word having high relevance to the characteristics specific to the product to which the user has an interest (that is, a word beneficial for searching for similar product). Thus, the search condition is more likely to contain a word having high relevance to the characteristics specific to the product selected by the user, whereas the search condition is less likely to contain a word having low relevance to the characteristics specific to the product selected by the user.

Note that, also in the electronic commerce system 1 according to the second embodiment, the same processing as that of the first embodiment is executed (refer to FIG. 7). However, in Step S102, for example, products displayed adjacent to the product selected by the user are extracted.

Third Embodiment

The overall configuration of an electronic commerce system 1 according to the third embodiment of the present invention is the same as that of the first embodiment (refer to FIG. 1). Further, also in the electronic commerce system 1 according to the third embodiment, the same search screen 30 as that of the first embodiment is displayed (refer to FIG. 2 to FIG. 4), and the same data as that of the first embodiment is stored (refer to FIG. 5).

Figure 8:
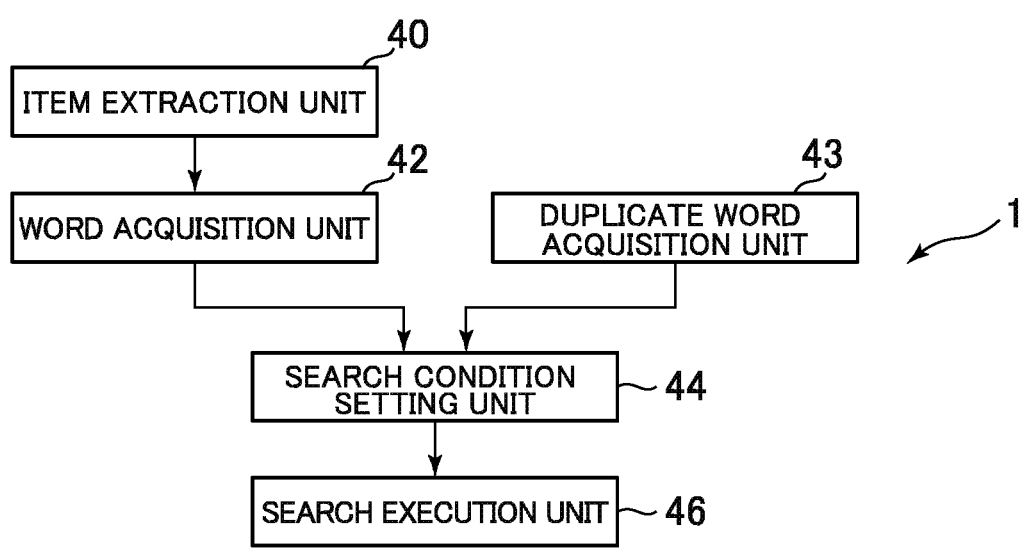
FIG. 8 is a functional block diagram for illustrating an example of functions implemented in an electronic commerce system according to the third embodiment.

FIG. 8 is a functional block diagram for illustrating functional blocks implemented in the electronic commerce system 1 according to the third embodiment. As illustrated in FIG. 8, the electronic commerce system 1 includes the item extraction unit 40 (item extraction means), the word acquisition unit 42 (word acquisition means), a duplicate word acquisition unit 43 (duplicate word acquisition means), the search condition setting unit 44 (search condition setting means), and the search execution unit 46 (search execution means). The functional block diagram of FIG. 8 is different from that of FIG. 6 in that the functional block diagram of FIG. 8 includes the duplicate word acquisition unit 43.

The item extraction unit 40 is the same as the item extraction unit 40 in the first embodiment or in the second embodiment. Further, the word acquisition unit 42 is the same as that of the first embodiment and the second embodiment. Thus, a description thereof is omitted here.

The duplicate word acquisition unit 43 acquires, from among words contained in text information associated with the item selected by the user, a word (a duplicate word) that has meanings that is the same as or is similar to that of a word contained in text information associated with an item associated with an image that is the same as or is similar to an image associated with the item selected by the user.

For example, in the case of the above-mentioned example (refer to FIG. 2 to FIG. 4), the duplicate word acquisition unit 43 acquires, from among words contained in the title of the product selected by the user, a word (a duplicate word) that has meanings that is the same as or is similar to that of a word contained in the title of the product of a product image (hereinafter referred to as "similar product image") that is the same as or is similar to a product image of the product selected by the user.

Now, it is assumed that the title of the product selected by the user is "(a)" given below and the title of the product of a similar product image is "(b)" given below.

(a) ABC X series tote bag violet 8HS999 043 001 [free shipping] [50% OFF] [new and unused]

(b) ABC 8H999-043 001 violet X series bag

First, the duplicate word acquisition unit 43 acquires words contained in respective titles. Further, the duplicate word acquisition unit 43 excludes a word containing a number from the words acquired from the respective titles. After that, the duplicate word acquisition unit 43 acquires a duplicate word from those titles.

In this case, for example, duplicate words as given below are acquired.

"ABC", "X series", "violet"

Although a description has been given above of a case where only one similar product image is considered, a plurality of similar product images may be considered as well.

The search condition setting unit 44 sets the search condition for searching for an item similar to the item selected by the user based on the word acquired by the word acquisition unit 42 and the duplicate word acquired by the duplicate word acquisition unit 43.

For example, it is assumed that words and duplicate words as given below are acquired by the word acquisition unit 42 and the duplicate word acquisition unit 43.

Word acquisition unit 42: "violet", "tote bag", "ABC"

Duplicate word acquisition unit 43: "ABC", "X series", "violet"

In this case, the search condition setting unit 44 sets a search condition as given below, for example.

"violet" and "tote bag" and "ABC" and "X series"

Note that, the search condition setting unit 44 may relatively increase the weight of the word and the duplicate word acquired by the word acquisition unit 42 and the duplicate word acquisition unit 43. That is, the search condition setting unit 44 may include, in the search condition, not only the word and the duplicate word acquired by the word acquisition unit 42 and the duplicate word acquisition unit 43 but also another word acquired from the title of the product selected by the user. Further, the search condition setting unit 44 may set the weight of the word and the duplicate word acquired by the word acquisition unit 42 and the duplicate word acquisition unit 43 larger than the weight of the other word.

The search execution unit 46 is the same as that of the first embodiment and the second embodiment. Thus, a description thereof is omitted here.

Figure 9:
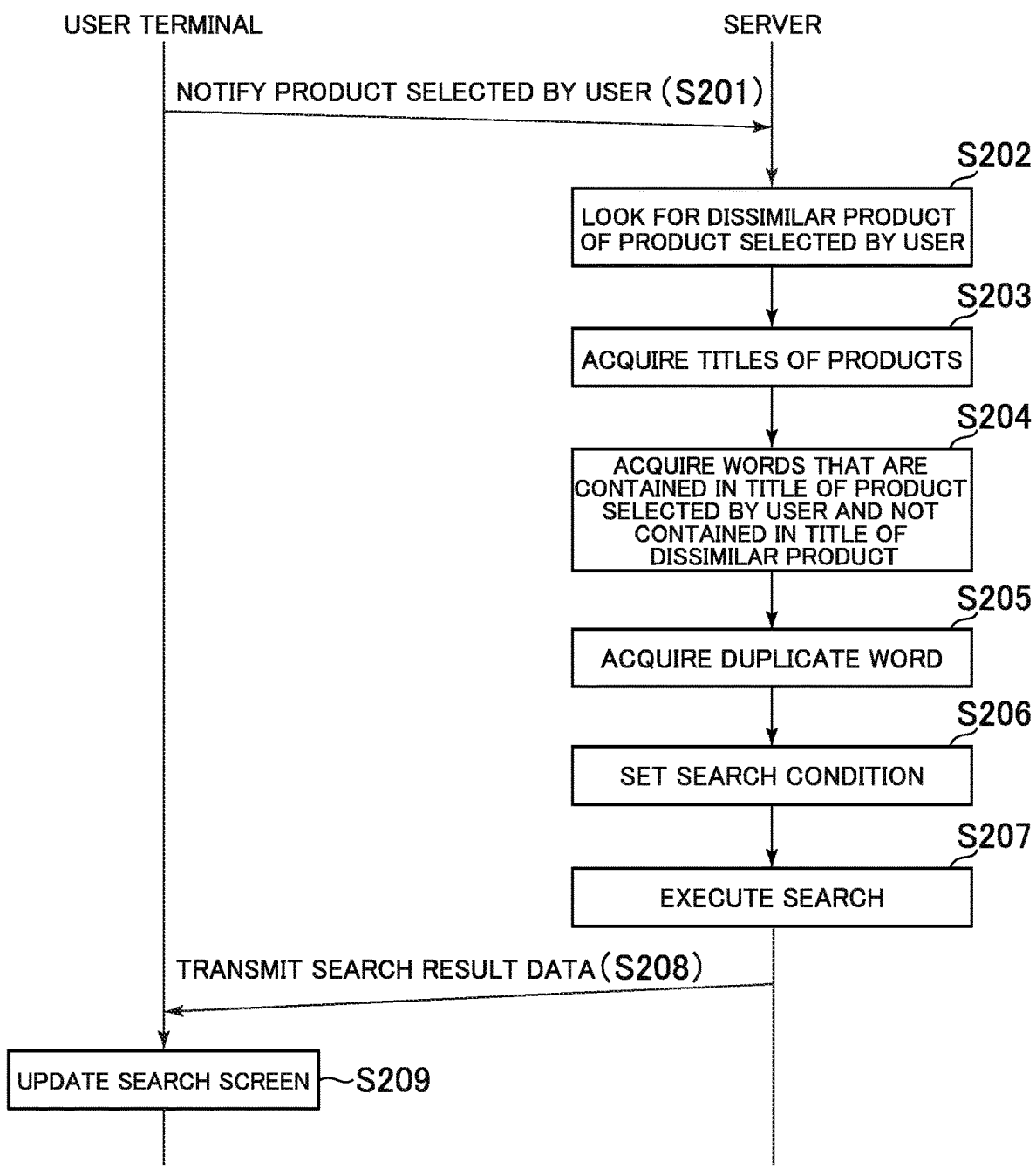
FIG. 9 is a diagram for illustrating an example of processing to be executed in the electronic commerce system according to the third embodiment.

Now, a description is given of processing to be executed in the electronic commerce system 1 according to the third embodiment. FIG. 9 is an illustration of an example of processing to be executed in the electronic commerce system 1 according to the third embodiment. As with FIG. 7, FIG. 9 is an illustration of an example of processing to be executed when the similarity search icon 35 is clicked.

Steps S201 to S204 of FIG. 9 are the same as Steps S101 to S104 of FIG. 7. Thus, a description thereof is omitted here.

After Step S204 is executed, the control unit 11 acquires a word (a duplicate word) contained duplicately in the titles acquired in Step S203 (S205). Note that, in this case, the control unit 11 excludes a word including a number.

After Step S205 is executed, the control unit 11 sets the search condition based on the word acquired in Step S204 and the duplicate word acquired in Step S205 (S206). Then, the control unit 11 executes a search based on the search condition set in Step S206 (S207).

After Step S207 is executed, the control unit 11 transmits the search result data indicating the search result to the user terminal 20 (S208). Then, the control unit 21 of the user terminal 20 updates the search screen 30 based on the search result data (S209).

In the electronic commerce system 1 according to the third embodiment described above, a word (a duplicate word) that has a meaning that is the same as or is similar to that of a word contained in the title of the product of a product image that is the same as or is similar to a product image of the product selected by the user among words contained in the title of the product selected by the user is acquired. Then, the search condition for searching for a similar product of the product selected by the user is set based on the duplicate word. The duplicate word as described above is highly likely to be a word indicating characteristics specific to the product selected by the user and the similar product. Thus, in the electronic commerce system 1 according to the third embodiment, the search condition is more likely to contain a word having high relevance to the characteristics specific to the product selected by the user. That is, the accuracy of the search condition for searching for a similar product can be improved.

Note that, the duplicate word acquisition unit 43 is not limited to the one described above.

For example, the duplicate word acquisition unit 43 may acquire a word (a duplicate word) that has a meaning that is the same as or is similar to that of a word contained in text information associated with an item associated with identification information that is the same as or is similar to identification information associated with the item selected by the user among words contained in text information associated with an item selected by a user.

For example, in the case of the above-mentioned example (refer to FIG. 2 to FIG. 4), the duplicate word acquisition unit 43 may acquire a word (a duplicate word) that has a meaning that is the same as or is similar to that of a word contained in a title of a product associated with the same product ID as the product ID of the product selected by the user among words contained in the title of the product selected by the user.

The duplicate word acquired as above is also highly likely to be a word indicating characteristics specific to the product selected by the user. Thus, also with the configuration described above, it is possible to increase the possibility that the search condition contains a word having high relevance to the characteristics specific to the product selected by the user. That is, it is possible to improve the accuracy of the search condition for searching for a similar product.

Further, for example, the duplicate word acquisition unit 43 may acquire, when a plurality of items are selected by the user, a word (a duplicate word) that corresponds to words whose meanings are the same or similar with each other and which are contained duplicately in pieces of text information associated with the plurality of items selected by the user.

For example, in the case of the above-mentioned example (refer to FIG. 2 to FIG. 4), the duplicate word acquisition unit 43 may acquire, when a plurality of products are selected by the user, a word (a duplicate word) that corresponds to words whose meanings are the same or similar with each other and which are contained duplicately in the titles of the plurality of products selected by the user.

The duplicate word thus acquired is highly likely to be a word indicating common characteristics of the plurality of products selected by the user. Thus, with the configuration described above, it is possible to increase the possibility that the search condition contains a word having high relevance to the common characteristics of the plurality of products selected by the user. That is, it is possible to improve the accuracy of the search condition for searching for a similar product.

Fourth Embodiment

The overall configuration of an electronic commerce system 1 according to the fourth embodiment of the present invention is the same as that of the first embodiment (refer to FIG. 1). Further, also in the electronic commerce system 1 according to the fourth embodiment, the same search screen 30 as that of the first embodiment is displayed (refer to FIG. 2 to FIG. 4), and the same data as that of the first embodiment is stored (refer to FIG. 5).

Figure 10:
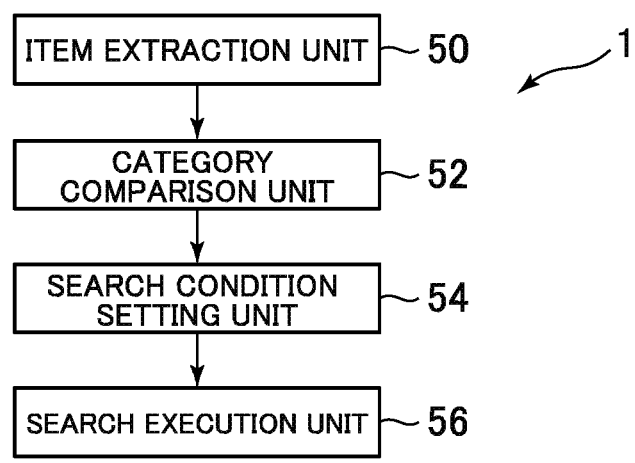
FIG. 10 is a functional block diagram for illustrating an example of functions implemented in an electronic commerce system according to the fourth embodiment.

FIG. 10 is a functional block diagram for illustrating functional blocks implemented in the electronic commerce system 1 according to the fourth embodiment. As illustrated in FIG. 10, the electronic commerce system 1 includes an item extraction unit 50 (item extraction means), a category comparison unit 52 (category comparison means), a search condition setting unit 54 (search condition setting means), and a search execution unit 56 (search execution means).

Those functional blocks are implemented by the server 10 or the user terminal 20. In the following, a description is given of a case where those functional blocks are implemented by the server 10 (search condition setting device). That is, a description is given of a case where the control unit 11 of the server 10 executes processing in accordance with a program to thereby function as the item extraction unit 50, the category comparison unit 52, the search condition setting unit 54, and the search execution unit 56.

The item extraction unit 50 extracts, when the user selects an item from a list of items to be selected by the user, at least one item from among items that are not selected by the user.

The operation of the item extraction unit 50 is similar to that of the item extraction unit 40 in the first to third embodiments. That is, the item extraction unit 50 extracts a product that is not the same as and is not similar to the product selected by the user (hereinafter referred to as "dissimilar product") from among products that are not selected by the user. Note that, this kind of dissimilar product is extracted from among products that have been displayed on the search screen 30.

For example, the item extraction unit 50 regards, as the dissimilar product, a product associated with a product image that is not the same as and is not similar to the product image associated with the product selected by the user. Thus, the item extraction unit 50 extracts, from among products that are not selected by the user, a product associated with a product image that is not the same as and is not similar to the product image associated with the product selected by the user.

Note that, the item extraction unit 50 may extract, as the dissimilar product of the product selected by the user, a product having a product ID different from the product ID of the product selected by the user.

The category comparison unit 52 compares the category of the item selected by the user and the category of the item extracted by the item extraction unit 50 with each other.

For example, the category comparison unit 52 compares the category of the product selected by the user and the category of the product extracted by the item extraction unit 50. For example, the category of the product is acquired from the title of the product. That is, it is determined whether or not the title of the product contains a word registered in dictionary data in which words indicating category names are registered. Then, when such a word is contained in the title of the product, the word is acquired as the category of the product.

Note that, when the category is registered in association with the product ID, this information may be used. That is, the category of the product may be acquired by acquiring the category associated with the product ID of the product.

The search condition setting unit 54 sets, when the category of the item selected by the user is different from the category of the item extracted by the item extraction unit 50, a search condition for searching for an item similar to the item selected by the user among items that do not belong to the category of the item extracted by the item extraction unit 50.

For example, the search condition setting unit 54 sets, when the category of the product selected by the user is different from the category of the product extracted by the item extraction unit 50, a search condition for searching for a product similar to the product selected by the user among products that do not belong to the category of the product extracted by the item extraction unit 50.

The search execution unit 56 executes a search based on the search condition set by the search condition setting unit 54.

Figure 11:
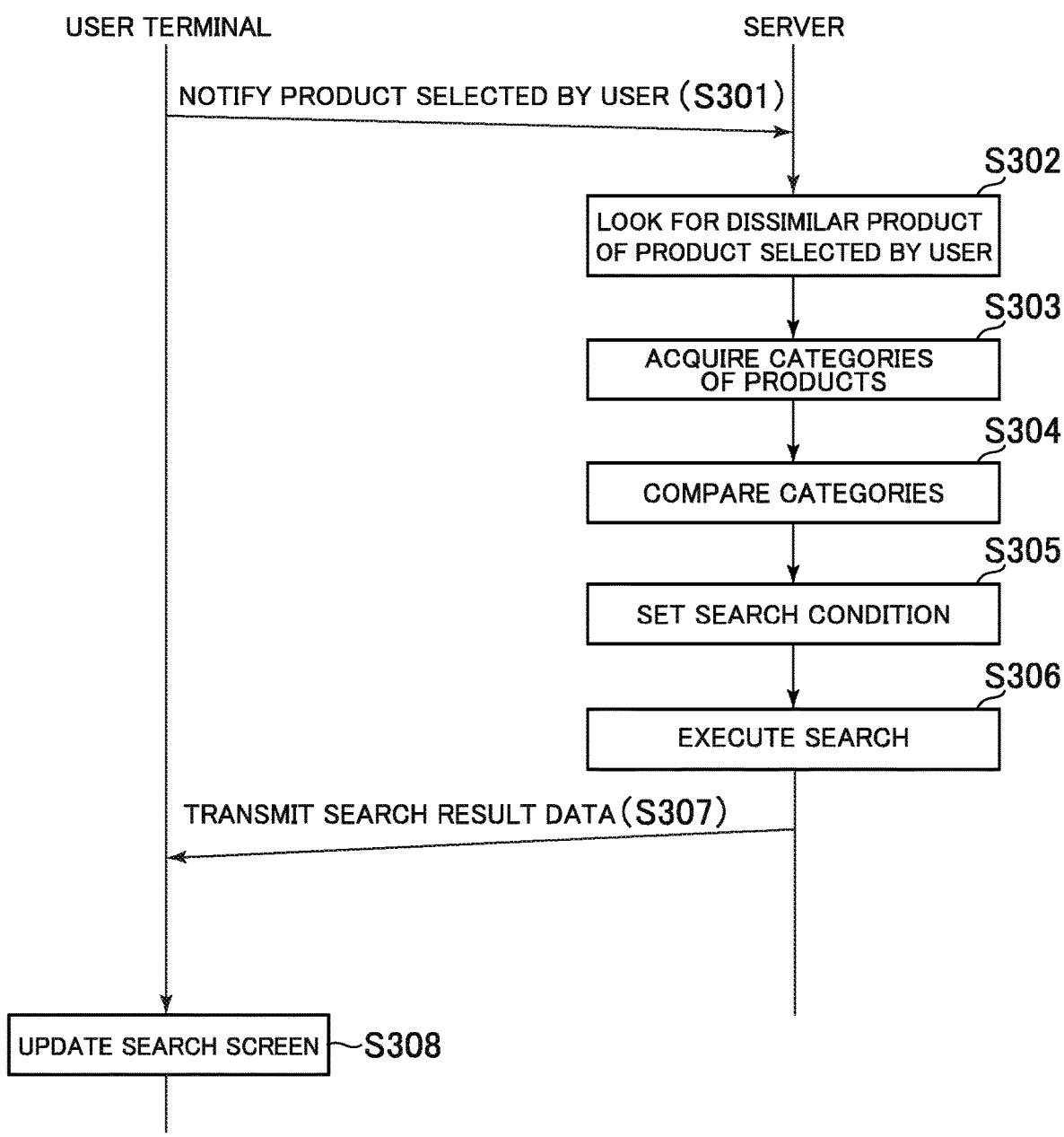
FIG. 11 is a diagram for illustrating an example of processing to be executed in the electronic commerce system according to the fourth embodiment.

FIG. 11 is an illustration of an example of processing to be executed in the electronic commerce system 1 according to the fourth embodiment. FIG. 11 is an illustration of an example of processing to be executed when the similarity search icon 35 is clicked.

Steps S301 and S302 of FIG. 11 are the same as Steps S101 and S102 of FIG. 7. Thus, a description thereof is omitted here.

After Step S302 is executed, the control unit 11 acquires the category of the product selected by the user and the category of the dissimilar product found in Step S302 (S303). For example, the control unit 11 acquires the category of the product selected by the user by extracting a word indicating the category name from the title of the product selected by the user. In another case, the control unit 11 acquires the category of the product selected by the user by acquiring the category associated with the product ID of the product selected by the user. In the same manner, the control unit 11 also acquires the category of the dissimilar product found in Step S302.

After Step S303 is executed, the control unit 11 compares the category of the product selected by the user and the category of the dissimilar product found in Step S302 (S304). Then, the control unit 11 sets the search condition based on the comparison result of Step S304 (S305).

For example, when the category of the product selected by the user is different from the category of the dissimilar product found in Step S302, the control unit 11 excludes a product that belongs to the category of the dissimilar product found in Step S302 from the search objects. That is, the control unit 11 sets a search condition for searching for a similar product of the product selected by the user from among products that do not belong to the category of the dissimilar product found in Step S302. On the other hand, when the category of the product selected by the user is the same as the category of the dissimilar product found in Step S302, the control unit 11 does not exclude a product that belongs to the category of the dissimilar product found in Step S302 from the search objects.

After Step S305 is executed, the control unit 11 executes a search based on the search condition set in Step S304 (S306). Then, the control unit 11 transmits the search result data indicating the search result to the user terminal 20 (S307). Then, the control unit 21 of the user terminal 20 updates the search screen 30 based on the search result data (S308).

In the electronic commerce system 1 according to the fourth embodiment described above, when the category of the product selected by the user is different from the category of the dissimilar product of the product selected by the user, a product that belongs to the category of the dissimilar product is excluded from the search objects. As a result, the accuracy of the search condition for searching for a similar product of the product selected by the user is improved.

Note that the fourth embodiment may be combined with any one of the first to third embodiments.

For example, in the first and second embodiments, when the category of the product selected by the user is different from the category of the product extracted by the item extraction unit 40 (item extraction unit 50), the search condition setting unit 44 may set, based on the word acquired by the word acquisition unit 42, the search condition for searching for a similar product of the product selected by the user among products that do not belong to the category of the product extracted by the item extraction unit 40 (item extraction unit 50).

Further, for example, in the third embodiment, when the category of the product selected by the user is different from the category of the product extracted by the item extraction unit 40 (item extraction unit 50), the search condition setting unit 44 may set, based on the word acquired by the word acquisition unit 42 and the duplicate word acquired by the duplicate word acquisition unit 43, the search condition for searching for a similar product of the product selected by the user among products that do not belong to the category of the product extracted by the item extraction unit 40 (item extraction unit 50).

Note that, the first to third embodiments and the fourth embodiment are the same in the following point. That is, the first to third embodiments and the fourth embodiment are the same in that the text information of the product selected by the user (e.g., title or category) and the text information of the product that is not the same as and is not similar to the product selected by the user (dissimilar product) are compared with each other and then the search condition for searching for a similar product of the product selected by the user is set in consideration of those differences. That is, the above-mentioned differences indicate the characteristics specific to the product selected by the user and the characteristics specific to the dissimilar product, respectively, and thus the first to third embodiments and the fourth embodiment are the same in that the characteristics specific to the product selected by the user are contained in the search condition and the characteristics specific to the dissimilar product are excluded from the search condition in consideration of the above-mentioned differences.

Note that, the present invention is not limited to the embodiments described above.

[1] For example, a dictionary (blacklist) in which words that should not be contained in the search condition such as "free shipping" are registered may be stored in the database 15 and the like. Further, the search condition may be configured not to contain a word registered in such a dictionary.

[2] For example, a dictionary in which synonyms such as "shoulder bag" and "over-the-shoulder bag" are registered may be stored in the database 15 and the like. Further, it may be configured to acquire synonyms of the duplicate word based on such a dictionary and include the duplicate word and the synonyms concatenated with an OR condition in the search condition.

[3] For example, processing may be executed in advance to determine whether or not product images are the same or similar with each other and then data indicating the determination result may be stored in the database 15. That is, data indicating a combination of products whose product images are the same or similar with each other may be stored in the database 15 in advance. In this manner, it is possible to reduce the processing load of Step S102 (FIG. 7) and Step S202 (FIG. 9).

[4] For example, when the user selects a yellow bag under a state in which a small number of yellow bags and a large number of red bags are displayed on the search screen 30 (that is, state in which the number of yellow bags displayed on search screen 30 is smaller than the number of red bags and the difference of the numbers is equal to or more than a threshold value), the color "yellow" is considered to have a significance for the user. Thus, in such a case, the word "yellow" may be preferentially included in the search condition or the weight of the word "yellow" in the search condition may be set larger than those of other words.

Similarly, when the user selects a tote bag under a state in which a small number of tote bags and a large number of shoulder bags are displayed on the search screen 30 (that is, state in which the number of tote bags displayed on search screen 30 is smaller than the number of shoulder bags and the difference of the numbers is equal to or more than a threshold value), the shape of "tote bag" is considered to have significance for the user. Thus, in such a case, the word "tote bag" may be preferentially included in the search condition or the weight of the word "tote bag" in the search condition may be set larger than those of other words.

As described above, regarding a word indicating an attribute that can be recognized by the user from the product image such as a color or a shape, such kind of a word may be preferentially included in the search condition or the weight of the word in the search condition may be set larger than those of other words. In this manner, it is possible to further improve the accuracy of the search condition for searching for a similar product of the product selected by the user.

Note that, when the functions described above are to be implemented, it is sufficient to store, in the database 15 or the like, dictionary data in which words relating to attributes that can be recognized by the user from the product image are registered. Further, when a word registered in such dictionary data is contained in the title of the product selected by the user, it is sufficient to add that word to the search condition without exception or to set the weight of that word in the search condition larger than those of other words.

[5] For example, the control unit 21 of the user terminal 20 (search condition setting device) may execute all or a part of Steps S102 to S106 (FIG. 7). That is, the user terminal 20 may implement all or a part of the functional blocks illustrated in FIG. 6. Note that, in this case, data necessary for executing Steps S102 to S106 needs to be stored in a storage unit accessible from the control unit 21. In another case, the database 15 may be configured to be accessible from the user terminal 20.

Similarly, the control unit 21 of the user terminal 20 (search condition setting device) may execute all or a part of Steps S202 to S207 (FIG. 9). That is, the user terminal 20 may implement all or a part of the functional blocks illustrated in FIG. 8.

Further, the control unit 21 of the user terminal 20 (search condition setting device) may execute all or a part of Steps S302 to S306 (FIG. 11). That is, the user terminal 20 may implement all or a part of the functional blocks illustrated in FIG. 10.

[6] For example, in the electronic commerce system 1, data such as electronic book data, music data, and video data may be sold as a product as well as things such as a bag and a drink. Further, in the electronic commerce system 1, a service may be sold as well as a product.

[7] In the above, an example of a case in which the present invention is applied to the electronic commerce system has been described. That is, an example of a case in which the search system according to the embodiments of the present invention is implemented in the electronic commerce system has been described. However, the present invention can also be applied to a system other than the electronic commerce system. Further, the present invention can also be applied to a search system for searching for an item other than a product and a service.

The invention claimed is:

1. A search condition setting device, comprising: a processor; and a memory device that stores a plurality of instructions, wherein when the processor executes the instructions in the memory device, the processor is operable to: select a first item from a list of items by operation of a user, wherein the list of items is the result of a first keyword search; extract at least one second item that is not similar to the first item from among the list of items; acquire a word that is contained in text information associated with the first item and is not contained in text information associated with the at least one second item; and set a search condition for searching for an item that is similar to the first item based on the acquired word, wherein the processor is operable to obtain, from among words that are contained in the text information associated with the first item, a word that is not contained in the text information associated with the second item being different from and not similar to the first item, set the search condition including the obtained word, and exclude, from the search condition, a word that is contained in the text information associated with the second item being different from and not similar to the first item wherein the processor is operable to acquire similarity degrees between an image associated with the first item and each image associated with the second items that are not selected by the user, and extract an item having the similarity degree that is less than a threshold value from among the second items that are not selected by the user.

2. The search condition setting device according to claim 1,
wherein the processor is operable to acquire similarity degrees between the image associated with the first item and each image associated with the second items that are not selected by the user, and
wherein the processor is operable not to extract a second item having the similarity degree that is larger than a threshold value from among the second items that are not selected by the user.

3. The search condition setting device according to claim 1,
wherein the processor is operable to:
acquire similarity degrees between the image associated with the first item and each image associated with the second items that are not selected by the user; and
extract a predetermined number of items in an order starting from an item having the lowest similarity degree from among the second items that are not selected by the user.

4. The search condition setting device according to claim 1,
wherein the processor is operable to extract, from among the second items that are not selected by the user, an item associated with identification information that is different from identification information associated with the first item.

5. The search condition setting device according to claim 1,
wherein a plurality of items can be selected from the list by the user,
wherein the processor is operable to extract an item having a displayed distance from the first item that is less than a predetermined degree from among the second items that are not selected by the user.

6. A control method for a search condition setting device, comprising: extracting, when a user selects a first item from a list of items, at least one second item that is not the same as and is not similar to the first item from among the list of items; wherein the list of items is the result of a first keyword search; acquiring a word that is contained in text information associated with the first item and is not contained in text information associated with the at least one second item; and setting a search condition for searching for an item that is similar to the first item based on the acquired word; wherein the setting comprises: obtaining, from among words that are contained in the text information associated with the first item, a word that is not contained in the text information associated with the second item being different from and not similar to the first item, setting the search condition including the obtained word, and excluding, from the search condition, a word that is contained in the text information associated with the second item being different from and not similar to the first item, and wherein the extracting comprises: acquiring similarity degrees between an image associated with the first item and each image associated with the second items that are not selected by the user, and extracting an item having the similarity degree that is less than a threshold value from among the second items that are not selected by the user.

7. A non-transitory computer-readable information storage medium storing a program for causing a computer to: extract, when a user selects a first item from a list of items, at least one second item that is not the same as and is not similar to the first item from among the list of items; wherein the list of items is the result of a first keyword search; acquire a word that is contained in text information associated with the first item and is not contained in text information associated with the at least one second item; and set a search condition for searching for an item that is similar to the first item selected by the user based on the acquired word; wherein the program causes the computer to obtain, from among words that are contained in the text information associated with the first item, a word that is not contained in the text information associated with the second item being different from and not similar to the first item, set the search condition including the obtained word, and exclude, from the search condition, a word that is contained in the text information associated with the second item being different from and not similar to the first item wherein the program causes the computer to: acquire similarity degrees between an image associated with the first item and each image associated with the second items that are not selected by the user, and extract an item having the similarity degree that is less than a threshold value from among the second items that are not selected by the user.

8. The search condition setting device according to claim 1,
wherein the processor is further operable to:
compare a category of the first item with a category of the at least one second item; and
set, when the category of the first item is different from the category of the at least one second item, a search condition for searching for an item that is similar to the first item among items that do not belong to the category of the at least one second item.

9. The search condition setting device according to claim 5,
wherein the processor is operable to extract, from among the second items that are not selected by the user, an item displayed adjacent to the first item.

10. The search condition setting device according to claim 1,
wherein the processor is further operable to execute a search based on the search condition.

11. The search condition setting device according to claim 1,
wherein the processor is further operable to acquire a duplicate word, the duplicate word being a word having a meaning that is the same as or is similar to that of a word that is contained in text information associated with an item associated with identification information that is the same as or is similar to identification information associated with the first item among words contained in text information associated with the first item; and set a search condition for searching for an item that is similar to the first item based on the acquired word and the duplicate word.

12. The search condition setting device according to claim 1, wherein the processor is further operable to acquire, when the user selects a plurality of first items, a duplicate word that corresponds to words whose meanings are the same or similar with each other and which are contained duplicately in the text information associated with the plurality of first items; and set a search condition for searching for an item that is similar to the first item based on the acquired word and the duplicate word.

13. The search condition setting device according to claim 1, wherein text information associated with the first item is a product title.

* * * * *